(No Model.) 2 Sheets—Sheet 2.
J. I. BOSWELL.
COMBINED COTTON SEED PLANTER AND FERTILIZER DISTRIBUTER.
No. 361,484. Patented Apr. 19, 1887.
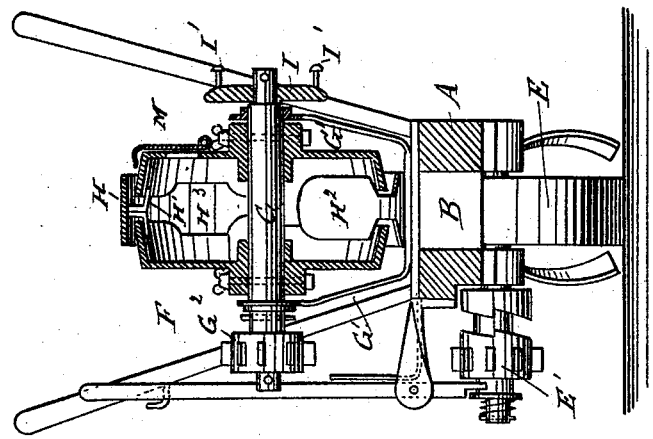
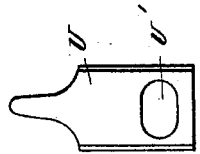
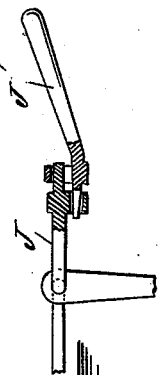
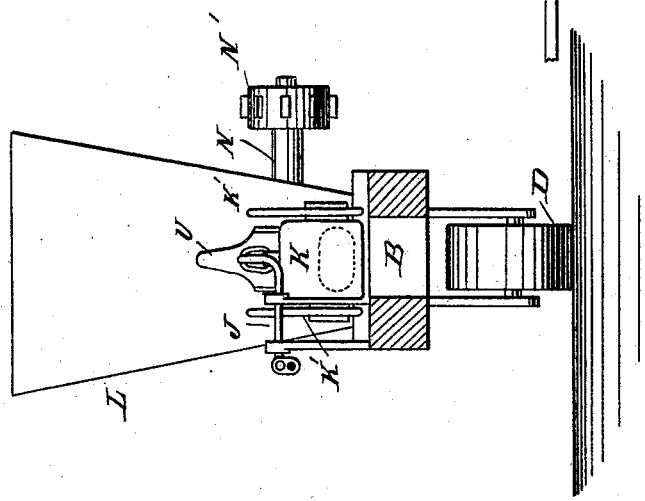
WITNESSES:
INVENTOR:
J. I. Boswell
BY Munn & Co
ATTORNEYS.

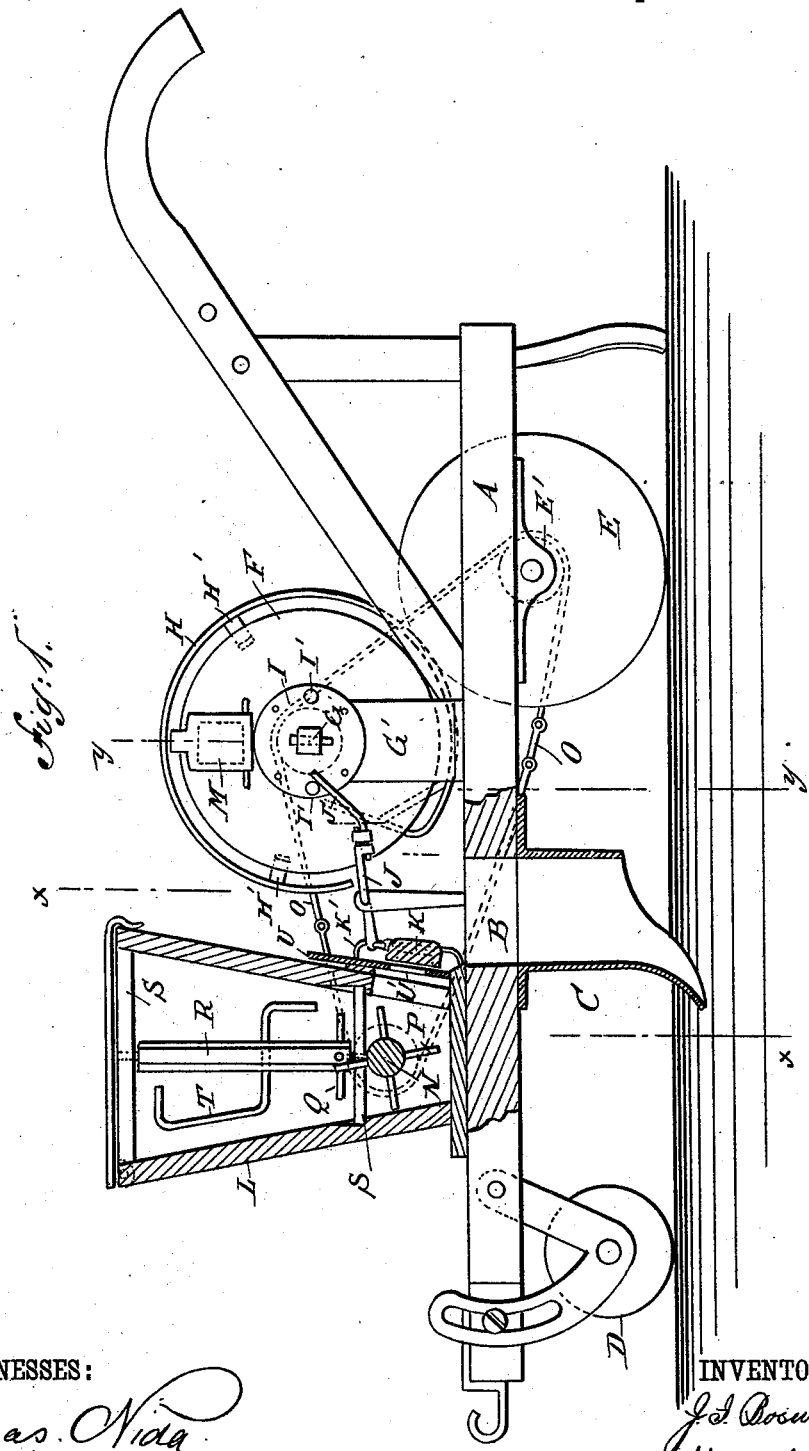

UNITED STATES PATENT OFFICE.

JOHN I. BOSWELL, OF NEAR CHASE CITY, VIRGINIA.

COMBINED COTTON-SEED PLANTER AND FERTILIZER-DISTRIBUTER.

SPECIFICATION forming part of Letters Patent No. 361,484, dated April 19, 1887.

Application filed November 5, 1886. Serial No. 218,101. (No model.)

*To all whom it may concern:*

Be it known that I, JOHN IVERSON BOSWELL, near Chase City, in the county of Mecklenburg and the State of Virginia, have invented a new and Improved Combined Cotton-Seed Planter and Fertilizer-Distributer, of which the following is a full, clear, and exact description.

My invention relates to certain new and useful improvements in the combined cotton-seed planter and fertilizer-distributer for which Letters Patent No. 336,285 were granted to me on the 16th day of February, 1886.

The object of my invention is to provide an improved cotton-seed planter and fertilizer-distributer which is simple and durable in construction and effective in operation.

The invention consists in certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a side elevation of my improvement, showing the fertilizer-distributer in section. Fig. 2 is a sectional end elevation of the same on the line $x\ x$ of Fig. 1. Fig. 3 is an end elevation of the fertilizer gage-plate. Fig. 4 is an end elevation of the crank-shaft, its support, and its extension, partly in section and parts being broken out; and Fig. 5 is a sectional end elevation of my improvement on the line $y\ y$ of Fig. 1.

In the beam or bed-plate A of the machine is formed an opening, B, through which the seed and fertilizer are distributed. To the lower side of the beam A and around the lower end of the opening B is attached the upper end of the opening-plow C, so that the seed and fertilizer will be guided into the bottom of the furrow opened by the said plow. The forward end of the machine is supported by the adjustable caster-wheel D, and the rear end of the machine rests on the drive-wheel E, journaled in suitable bearings attached to the beam A.

The seed-drum F is attached to the axle G, the journals of which revolve in bearings in the standards G', erected on the beam A. The axle G is provided on one end with the chain-wheel $G^2$ and at the other end with the wheel I, provided with two or four pins, I', which engage with the extension J' of the crank-shaft J, which operates the gate K of the fertilizer-hopper L in the same manner as is described in my former patent above referred to. The seed-drum F is made in two parts in the form of short hollow cylinders closed at one end, and which are secured to the axle G with their open ends toward each other and at a little distance apart.

Around the drum F there is an open band, H, of sufficient width to cover the space between the two halves of the drum however adjusted, the ends of which do not quite meet, the space between the said ends being at the lower forward part of the drum, as shown in Fig. 1, so as to be over the opening B. The open band H is held stationary by being attached to the beam A or the standards G', and is kept in place upon the drum F by T-lugs H', attached to the said band and passing through the slot in the said drum.

The lower end, $H^2$, of the open band H is bent inward and has a neck formed upon it to pass through the slot of the drum F, is widened, inclined forward, and slightly concaved, and is strengthened in position by an inclined brace, (shown in dotted lines in Fig. 1,) so that the said end $H^2$ will serve as an apron to receive the seed.

In the opposite sides of the drum F in the free edges of the two halves of the drum are correspondingly-widened spaces $H^3$, so that when either of the said spaces comes opposite to end $H^2$ then the seeds upon the said end will pass out through the said spaces and drop through the opening B to the ground. When the seed is to be drilled, the two halves of the drum F are separated far enough for the seed to pass out at any part of the space between the halves of the drum as it revolves past the space between the ends of the band H.

Seed is introduced into the drum F through an opening in one of its sides, which opening is closed by a door, M. (Shown in Figs. 1 and 2.) The two halves of the drum have in the centers of their closed ends hubs extending inward and outward far enough to make them steady on the axle. Through the outer ends of these hubs are formed bolt-holes which range with slots formed lengthwise in the axle G. Through the bolt-holes in the hubs and through the slots in the axle are passed bolts with thumb-nuts, which bolts serve the double purpose of fastening the drum to the axle and as set-screws to fix the two halves of the drum at any desired distance apart for either dropping or drilling the seed.

The fertilizer-distributer L, placed in front of the drum F, is provided with a shaft, N, carrying on its outer end a chain-wheel, N', over which passes the endless chain O, operated from the chain-wheel E' on the driving-wheel E, and the chain O also passes over the wheel G² and rotates the axle G of the drum F. To the shaft N are attached radial pins P, which, when said shaft N is revolved, agitate the fertilizer in the lower part of the hopper L and feed it out through the discharge-opening in the lower part of the rear side of the said hopper L.

The central pins, P, engage with radial pins Q, attached to the lower part of the vertical shaft R, so that the latter will be revolved by the revolution of the said shaft N. The journals of the vertical shaft R revolve in bearings in cross-bars S, attached to the lower and upper parts of the hopper L. To the vertical shaft R is attached a bent rod, T, which, as the said shaft is revolved, keeps the fertilizer in the upper part of the hopper L stirred up, so that it will pass down freely into the lower part of the said hopper to take the place of the fertilizer discharged by the pins P.

The amount of fertilizer discharged is regulated by a series of gage-plates, U, the edges of which are beveled and slide in grooved cleats or other suitable ways attached to or formed upon the rear side of the hopper L. In the plate U is formed an aperture, U', through which the fertilizer escapes. The machine is made to discharge more or less fertilizer by removing the plate U and replacing it with another plate having a larger or smaller discharge-aperture, U'.

The discharge of the fertilizer is cut off or stopped by the gate K, the ends of which are reduced in size and slide up and down in staples K' or other keepers, attached to the rear side of the hopper L, and which is made sufficiently heavy to cause it to close by its own weight. The gate is connected with the crank-shaft J and operated by the pins of the wheel I, secured to the shaft G of the drum F.

Having thus fully described my invention, I claim as new and desire to secure by Letters Patent—

1. In a combined cotton-seed planter and fertilizer-distributer, the combination, with the hopper L and a driving mechanism, of the horizontal shaft N, having radial pins P, and the vertical shaft R, having radial pins Q, engaging with the said pins P and provided with the bent rod T, substantially as herein shown and described, whereby the fertilizer in all parts of the said hopper will be thoroughly agitated, as set forth.

2. In a combined cotton-seed planter and fertilizer-distributer, the combination, with the beam A and the driving mechanism, of the drum F, having a central slot and opposite discharge-openings, and the open band H, having T-shaped lugs H' and a discharge-apron, H², substantially as herein shown and described, whereby the seed will be discharged through the said opening by the revolution of the said drum, as set forth.

JOHN I. BOSWELL.

Witnesses:
WM. H. SMITH,
C. B. ELANE.